KARL PRINZ ZU LOWENSTEIN.
PROCESS FOR CONVERTING STEAM HEAT OF A LIQUID INTO MOTIVE FORCE.
APPLICATION FILED JULY 11, 1916.
1,219,970.
Patented Mar. 20, 1917.
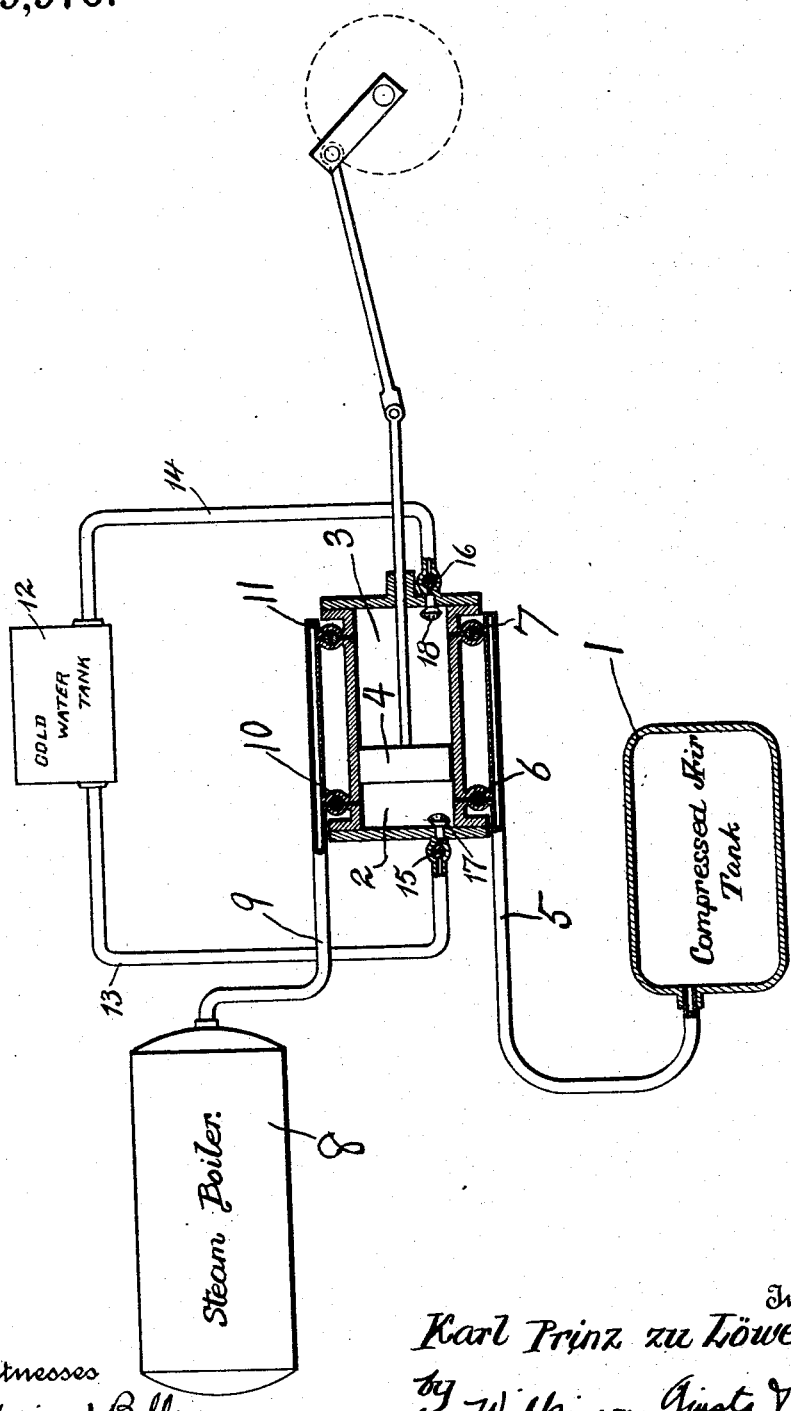

UNITED STATES PATENT OFFICE.

KARL PRINZ zu LÖWENSTEIN, OF KLEINGEMÜND, NEAR NECKARGEMÜND, GERMANY.

PROCESS FOR CONVERTING STEAM HEAT OF A LIQUID INTO MOTIVE FORCE.

1,219,970.

Specification of Letters Patent.

Patented Mar. 20, 1917.

Application filed July 11, 1916. Serial No. 108,738.

*To all whom it may concern:*

Be it known that I, KARL PRINZ ZU LÖWENSTEIN, a subject of the German Emperor, and resident of Kleingemünd, near Neckargemünd, Germany, have invented new and useful Processes for Converting Steam Heat of a Liquid into Motive Force, of which the following is a specification.

The object of the invention is to convert the steam heat present in a liquid including the socalled latent heat into motive force. This is achieved by allowing the steam to work as usual but particularly using it more as a heat carrier, causing the steam to impart its heat to a gaseous elastic body such as a gas or steam, preferably a high compressed gas, during confined or checked expansion. This gas the pressure of which has been increased by the heat admitted, is caused to do work in the working cylinder of a motor, thereby converting the heat of the gas into work.

If atmospheric air, or, for practical reasons, preferably high compressed air from a compressed air container is admitted into the cylinder of a motor, say for instance up to about a quarter of the piston stroke and if then the supply is cut off and steam introduced to such an amount that the temperature of the gas in the cylinder increases, say to a temperature of about 100 degrees higher than that existing in the compressed air container, the mixture of air and steam will have a pressure of about 40% higher than that in the compressed air container. If this mixture of air and steam is caused to expand and to do work, all the steam of the mixture will be condensed in consequence of the conversion of the steam into work. The heat of the steam and also the latent heat as well as a part of the heat of the condensed liquid will thereby be transferred to the compressed air and will in this manner be converted into motive force.

In practice the process may be carried out with advantage if the same compressed air is used again and again. For instance, compressed air of about 12 atmospheres is kept in a container. Of this air an amount is admitted into the cylinder which will fill the latter to about a quarter of its contents; then the supply is cut off and steam is introduced to such an extent, that the mixture will have a temperature of about 100 degrees or more higher than that of the air contained in the compressed air container. The mixture of air and steam in the cylinder is then caused to expand and do work. The steam admitted must have a pressure at least as high as that present in the compressed air container. At the end of the stroke the temperature will be much lower, because heat has been consumed while performing work. The final temperature in the most favorable case will again be equal to that existing in the compressed air container.

The compressed air charge is not allowed to exhaust but the same cycle is repeated at the opposite side of the piston. The expanded gas charge is thereby compressed by the returning piston and in order not to increase its heat by the compression, cooling water is injected. After the air has been compressed in the very quarter of the cylinder which it filled originally it is released to flow to the compressed air container. The charges 1 and 2 of the compressed air absolutely counter-balance each other and the work performed with one charge is used for expelling the preceding charge and pressing it to the compressed air container. Practically the compression may take place in a second cylinder coupled with the first cylinder.

Instead of using steam high heated water may be injected directly into the compressed air charge. A part of this injected liquid will during expansion be converted into steam and then again condensed, but otherwise the liquid acts as steam.

In the drawing forming part of this specification, the figure is a diagrammatic view, partly in elevation and partly in section, of an apparatus for carrying out the above process.

Referring more particularly to this drawing, 1 designates a compressed air tank communicating with the chambers 2 and 3 to opposite sides of the piston 4 by a pipe 5. Passage of the compressed air to the chambers 2 and 3 is under the control of valves 6 and 7 respectively, operated by any suitable means.

At 8 is indicated a steam boiler or source of hot water supply, and which is in connection through a pipe 9 with the chambers 2 and 3; passage through such pipe 9 being under the control of valves 10 and 11.

Cold water from a tank 12 is admitted to the chambers 2 and 3 through pipes 13 and 14, under the control of valves 15 and 16, and sprayed thereinto in fine jets through nozzles 17 and 18. The other engine parts necessary to an understanding of the present invention are indicated diagrammatically in the drawings, and will be clear to those skilled in this art.

In the drawings, the piston 4 has been shown as advanced substantially a fourth of its stroke in the chamber 2, and the valve 6 indicated as closed. Compressed air from the tank 1 and through the pipe 5 having been admitted to the chamber 2 during the initial travel of the piston 4, the valve 6 has now been closed and the valve 10 opened to permit steam or other carrier of heat to issue through the pipe 9 and into the chamber 2, so that it will be compressed together with the air therein upon the further travel of the piston 4; the transfer of heat thereupon taking place and the expansion of the fluids developing power all in the manner as above fully described.

On the reverse movement of the piston 4 the same action takes place in the chamber 3, the valves 7 and 11 being actuated to open and close at the same period.

As described in lines 69 to 86 page 1 of this specification, the expanded charge is not exhausted but is compressed in the respective chambers on the return motion of the piston 4, and, in order to prevent raising the temperature of such charge by compressing, the valves 15 and 16 will be so timed as to permit the entrance of water from the tank 12, which will be sprayed through the nozzles 17 and 18 in fine jets and absorb the heat of compression. After the charge has been compressed sufficiently, the valves 6 and 7 will be opened to permit the same to be forced back through the pipe 5 into the tank 1, where it will be stored for further utilization.

I claim:—

1. The process substantially as described, which consists in supplying a compressed fluid to an engine, admitting a heat carrier to said engine, allowing the fluid and heat carrier to expand, causing the fluid to absorb the heat of said carrier, and finally re-compressing the fluid and returning it to its source of supply.

2. The herein described process for developing motive power, consisting in supplying a compressed fluid and a heat carrier to an engine, allowing the fluid and heat carrier to expand and develop power, re-compressing the fluid after expansion, supplying a cooling agent during the re-compression, and returning the re-compressed fluid to its source of supply, substantially as described.

3. A process for converting the steam heat of a liquid into motive force, consisting in admitting compressed gas into a working space, cutting off the gas supply, admitting steam to the gas confined in the working space, allowing the steam to condense, using the latent heat of said steam to increase the heat of the compressed gas, causing the gas to perform work and escape to the gas supply.

4. A process for converting the steam heat of a liquid into motive force, consisting in admitting compressed gas into a working space, cutting off the gas supply, admitting steam to the gas confined in the working space, allowing the steam to condense, using the latent heat of said steam to increase the heat of the compressed gas, causing the gas to perform work, and using said charge of gas to expel the preceding charge out of the working space and press it to the gas supply again.

In testimony, that I claim the foregoing as my invention, I have signed my name in presence of two witnesses, this twenty-eighth day of February 1916.

KARL PRINZ zu LÖWENSTEIN.

Witnesses:
HENRY HASPER,
ALLEN F. JENNINGS.